United States Patent

[11] 3,549,871

| [72] | Inventors | Kiyokazu Okamoto;<br>Hiroshi Shinagawa, Tokyo, Japan |
|---|---|---|
| [21] | Appl. No. | 620,939 |
| [22] | Filed | Mar. 6, 1967 |
| [45] | Patented | Dec. 22, 1970 |
| [73] | Assignee | Nippon Electric Company, Limited<br>Tokyo, Japan |
| [32] | Priority | Mar. 8, 1968 |
| [33] | | Japan |
| [31] | | No. 41/14216 |

[54] DIGITAL INTERPOLATOR
6 Claims, 6 Drawing Figs.

[52] U.S. Cl. ................................................. 235/152, 235/92
[51] Int. Cl. ........................................... G06f 15/34, H03k 19/20
[50] Field of Search ........................................ 235/151.11, 151.1, 197, 152; 340/324.1

[56] References Cited
UNITED STATES PATENTS
3,254,203  5/1966  Kveim ........................ 235/152

Primary Examiner—Eugene G. Botz
Attorney—Ostrolenk, Faber, Gerb & Soffen

ABSTRACT: A digital interpolator for tracing $n$ dimensional curves and the like which generates followup pulses in a uniform basis with each followup pulse being separated from the previous followup pulse by a predetermined unit length to simulate stepping of the followup points in a constant uniform manner. As soon as $n$ followup points are stepped along any of the $n$ coordinate axes an output pulse is automatically generated parallel to the associated coordinate axes wherein the followup pulse causes a step of $n$ times the unit length taken by the followup points so as to provide greater operating speeds and greater curve tracing accuracy than was heretofor possible.

PATENTED DEC 22 1970

INVENTORS
KIYOKAZU OKAMOTO
HIROSHI SHINAGAWA
BY
OSTROLENK, FABER, GERB & SOFFEN
ATTORNEYS

INVENTORS
KIYOKAZU OKAMOTO
HIROSHI SHINAGAWA
BY
OSTROLENK, FABER, GERB & SOFFEN
ATTORNEYS

DIGITAL INTERPOLATOR

The instant invention relates to digital interpolators for use in curve tracing and more particularly to interpolators employing a pulse-distributing computer unit and drive means operable upon receipt of the command pulse signal from the computer unit to provide a novel and improved digital interpolator of the type described herein which is capable of tracing any given curve with an accuracy higher than that heretofore obtainable such that the deviation of the output point from the curve being traced is substantially reduced as compared with conventional digital interpolators and, which is further capable of performing the curve tracing operation with increased speed as compared with conventional devices while maintaining accuracy at a high level.

Conventional digital interpolators typically operate such that the output point from the computer is shifted in a step by step manner with the same unit step length as the followup point and in the following manner:

The given line of curve under control of the computer output, and the deviation of the followup point from the curve being traced is maintained within the length of a single followup step, which corresponds to the constant of the space lattice framed for reference in the space in which the curve given is supposed to lie and interpolation is effected therealong from one lattice point as a starting point to another lattice point as an end point. According to the present invention, the maximum possible deviation or normal distance of the output point from the curve being traced, which is conventionally equal to one step length of the output point, is reduced through the use of the instant invention, to 1/**2 times the step length owing to the corresponding relation between two step lengths of the followup point and one step length of the output point.

In order to realize the corresponding relation between the step lengths of the followup and output points, the instant invention utilizes logic means in a digital interpolator between its pulse-distributing computer unit and its drive means. The logic means is designed to count or accumulate the components of the command or followup pulse signal from the computer unit in the respective axis directions of the coordinate system framed for reference in the space in which the curve given is supposed to lie and should operate, each time at which the value of the accumulated total in the direction of any coordinate axis reaches ±2, to produce an output signal having a polarity determined by the sign (plus or minus) of the accumulated total. The output signal is subsequently transformed into a desired form of physical quantity in the drive means designed to that effect. The pulse-distributing computer unit used in the inventive apparatus may take any known form so long as it is a computer of the type which functions to produce a followup signal effective to shift the followup point stepwise in a manner such that its deviation from the input curve being traced is effectively maintained within the length of step of the followup point. One preferred form of such pulse-distributing computer is operable to produce a followup signal effective at all times to drive the followup point in one of the directions of distribution allowed thereto with the given direction in which the curve is traced and with the plus or minus sign of the respective component of the vector drawn normal to the curve from the present site of the followup point and that in the direction from the negative to the positive space region or from the positive to the negative space region as defined by the curve being traced on either side thereof, depending upon whether the followup point actually lies in such negative or positive space region.

One suitable drive means which may be used in the inventive apparatus for transforming the output signal from the logic means into an appropriate physical quantity effective to shift the output point stepwise may include a combination of an amplifier and a step motor commonly used in digital interpolators of the type described.

In general, such step motor or other driving device commonly used in this field and having a digital-to-analog conversion function has rather limited frequency response characteristics and thereby operates at a much lower speed than that of the computer unit used in association with such driving devices. According to the present invention, such difficulty can be effectively overcome so as to yield the significant advantage over conventional systems in that the curve-tracing speed or the speed of the followup movement along the curve can be increased to 2 times that available in conventional devices without detracting from the tracing accuracy to any extent even when conventional step motors are employed and are operated at their normal rates of speed. This advantage is accounted for by the fact that, according to the present invention, the maximum possible deviation of the output point from the curve being traced corresponds to 1/2 times the length of the output step and is thus left unchanged as long as the length of the step of the output point is only increased to not more than 2 times that length of step previously employed. It will be appreciated, therefore, that the instant invention is highly valuable for use in numerous industrial applications including numerical control of drafting and machining operations, enabling such operations to be performed at speeds of up to 2 times that obtainable in conventional systems.

Conversely, it will also be appreciated that, according to the instant invention, the tracing accuracy can be increased to a substantial degree since the maximum possible deviation of the output point from the curve being traced can be reduced to 1/**2 times the conventional deviation by employing a computer speed twice as high as that conventionally used.

The interpolation computer selectively steps in either the $x$ or $y$ direction at any given instant (in either the plus or minus direction depending upon the slope of the curve) in order to follow the slope of the curve. Separate multistage bidirectional counters are provided for each axis for stepping the associated counter in either the positive or negative direction as the case may be. When the counter accumulates the count of a predetermined magnitude whether it be of a positive or a negative polarity, an output pulse is provided together with a polarity indication for driving the associated step motor or other servo device through an incremental step equal to an integral multiple of the step unit generated by the interpolation computer. Simultaneously with the execution of the output step pulse the bidirectional counter which has achieved a predetermined magnitude is reset in readiness for the next operation. Through the use of this system the output point at any given instant of time is separated from the followup point by no more than a distance of 1/**2 so as to insure more accurate curve following.

It is therefore one object of the instant invention to provide a novel method and apparatus for plotting curves and the like.

Another object of the instant invention is to provide a novel apparatus for plotting curves controlling machine tools and the like comprising means for generating followup points in the tracing of a curve or slope and further means controlled by the accumulation of followup points for each reference axis to generate an output pulse upon the accumulation of a predetermined number of followup points to develop a curve having higher accuracy than heretofore capable in conventional systems.

These and other objects of the instant invention will become readily apparent from a consideration of the accompanying description and drawings in which.

Figure 1:
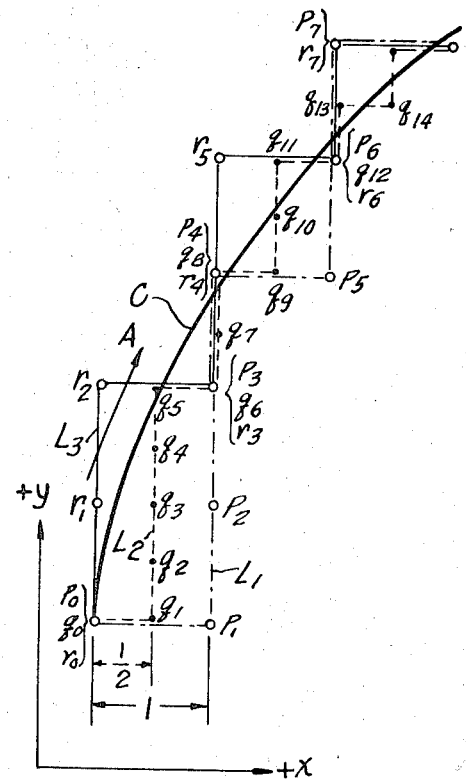
FIG. 1 is a plot illustrating the stepwise movement of followup and output points in the apparatus of the instant invention and in conventional apparatus to facilitate a comparison therebetween.

Reference will now be made to FIG. 1 in order to explain the principles of the instant invention as compared with a conventional system.

In FIG. 1 the train of points $P(p_0, p_1, p_2,...)$ which are arranged along $P(p_i$ine $L_1$ represents the stepwise movement of the followup and output points obtainable in conventional apparatus using a typical pulse distribution system when a given curve C is traced in the direction indicated by the arrow A. One of the many systems operating in this fashion is manifested in U.S. Pat. No. 3,254,203, issued May 31, 1966 which illustrates curve following techniques.

The train of points Q ($q_0, q_1, q_2,...$) arranged along dashed line $L_2$ represents the stepwise movement of the followup point obtainable from a computer unit of the inventive apparatus employing a similar conventional pulse distribution system. A further train of points R ($r_0, r_1, r_2,...$) arranged along solid line $L_3$ represents the stepwise movement of the output point obtainable from a second component or logic device of the system described herein which forms a feature of primary importance in the instant invention. Reference characters $x$ and $y$ indicate respective axes of the coordinate system in which the curve C is framed for reference. For convenience, the description made herein is provided with the assumption that interpolation is effected with a curve C lying in the two-dimensional space or plane represented by the coordinate system or plane of FIG. 1. It should be apparent that the interpolation of any three-dimensional curve can be performed principally and quite the same manner as described hereinbelow in connection with the plane curve C and any further description of a three-dimensional system will be omitted for purposes of simplicity.

As can clearly be seen in FIG. 1, the train of points Q, that is, the successive sites of the followup point generated by the inventive apparatus are distributed at intervals each corresponding to one half of the interval between every two adjacent points in the train P, which points are generated by conventional apparatus. On the other hand, the train of points R, that is, the successive sites of the output points, are shown distributed at intervals each corresponding to twice the regular interval of the sites of the followup points Q or, in other words, distributed at intervals equal to the intervals generated by conventional apparatus.

More specifically, the output points R are shifted one step in the positive or negative direction of each coordinate axis each time the corresponding $x$ or $y$ (or $z$) components of the followup pulse signal emitted from the computer unit for the distribution of the train of points Q have been counted up or accumulated to the total value of $\pm 2$ (as one preferred embodiment) and at the same time such accumulation is reduced to zero (i.e., cleared) by appropriate resetting means, in a manner to be more fully described hereinbelow.

Considering the operation, as the followup point Q starting at point $q_0$ is shifted stepwise through point $q_1$, and $q_2$ to reach point $q_3$, the accumulated total of the successive $y$ components of the followup signal reaches a count of $+2$ and at this moment the output point R is shifted accordingly in the $y$ direction from point $r_0$ to $r_1$. Simultaneously therewith the accumulation of $+2$ in the $y$ direction is reset to zero. Similarly, as the followup point Q is shifted from $q_3$ through $q_4$ to $q_5$, the accumulation of the successive $y$ components of the followup signal again achieves a total of $+2$ and, at this moment, the output point R is further shifted from $r_1$ to $r_2$. The accumulation of $+2$ is then automatically reset to zero. Further, when the point Q is shifted from $q_5$ to $q6$, the accumulation of the $x$ components of the followup pulse signal reaches a count of $+2$ as a result of the step from $q_0$ to $q_1$ and from $q_5$ to $q_6$ thereby causing the output point R to be shifted in the positive $x$ direction from $r_2$ to $r_3$ while at the same time resetting the $x$ accumulation of $+2$ to zero. It can be readily understood that by repetition of the above process the train of points R is obtained for the entire curve C as the train of points Q is distributed.

A consideration of the deviation of the train of output points R from the curve to be traced will now be given:

As the train of points R is distributed, the train of followup points Q is distributed basically in two modes. For the sake of simplicity, the description given herein will only be set forth in connection with the cases where the distribution is allowed only in the directions of $+x$ and $+y$. It will be apparent that any other possible cases where distribution is allowed in a different combination of directions, such as $+x$ and $-y$, $-x$ and $+y$, or $-x$ and $-y$, can be explained in quite the same manner.

Figure 2:
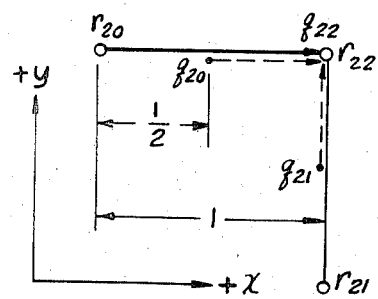
FIG. 2 is a diagram illustrating the stepwise movement in the inventive apparatus when the output and followup points coincide with each other.

The first mode of distribution corresponds to the cases where the destination or the next location $r_{22}$ of the output point R coincides with the point $q_{22}$ of the followup point Q, as is illustrated in FIG. 2. As the first example, let it be assumed that at a given instant of time the points Q and R occupy the locations $q_{20}$ and $r_{20}$, respectively. Let it now be assumed that the followup point is stepped to the location $q_{22}$. At this particular time an accumulation in the $x$ direction of $+2$ occurs causing the output point to step from location $r_{20}$ to location $r_{22}$. Thus at any given instant of time the deviation or distance of the train of points Q is maintained within the length of one half step of the distance between any two output points or conversely one half step of the distance of any two points P in conventional systems. It can clearly be seen that movement in the vertical direction of the followup point from position $q_{21}$ to $q_{22}$ that the same operation and relationship obtains.

Figure 3:
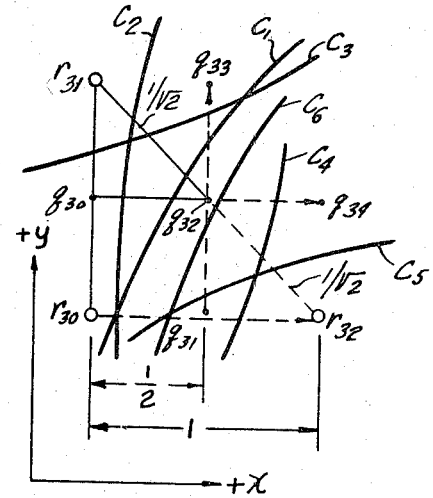
FIG. 3 is a diagram illustrating the stepwise movement in the instant invention when the output and followup points do not coincide.

In the second mode of distribution, the destination $r_{31}$ or $r_{32}$ of the output point R does not coincide with either destination $q_{33}$ or $q_{34}$ of the followup point Q as is illustrated in FIG. 3. In such cases, the adjacent portion of the curve being interpolated lies, for example, in accordance with conventional pulse distribution systems, in a position such as to have a point in common with at least one of the line segments $q_{32}-q_{30}$, $q_{32}-q_{31}$, $q_{32}-q_{33}$ or $q_{32}-q_{34}$. In cases where the curve being interpolated has a point in common (i.e. intersects) either one or both of the segments $q_{32}-q_{31}$ and $q_{32}-q_{34}$ such as for example the curves $C_4$, $C_5$ or $C_6$, then the followup point Q is shifted to point $q_{34}$, for example, in accordance with conventional pulse distribution systems. In these cases, since each of the curves $C_4$, $C_5$ and $C_6$ also has a point in common (i.e., intersects) with the line segment $q_{32}-r_{32}$ having a length of $1/2$ units, the unit length corresponding to the regular interval between the adjacent points in the train R, that is, to one step length of the output point, the deviation of the point $r_{32}$ is maintained within half the unit length. In cases where the curve being interpolated has a point in common with either one or both of the line segments $q_{32}-q_{30}$ and $q_{32}-q_{33}$ such as curves $C_1$, $C_2$ or $C_3$, it also has a point in common with (i.e., intersects) the line segment $q_{32}-q_{31}$ and hence the deviation of the output point $r_{31}$ is maintained within $1/2$ times the unit length.

More specifically, let it be assumed that at a given instant of time the output point R occupies the location $r_{30}$ and the followup point Q occupies the location $q_{32}$. If the curve being traced is any one of the curves $C_4$, $C_5$ or $C_6$, the conventional system will cause the followup point Q to move to the location $q_{34}$. Having accumulated a count of $+2$ for the $x$ direction the output point will move to location $r_{32}$ so as to be separated by a distance of one half the unit step from the followup point $q_{34}$. In the original position points $r_{30}$ and $q_{32}$ are separated by a distance of $1/**2$ times the unit length between any two output points R which in any case is always less than the distance between output and followup points P in conventional systems as can clearly be seen from a consideration of FIG. 1.

As a second example, let it be assumed that the point Q moves from location $q_{31}$ to location $q_{32}$ and thence to location $q_{33}$. Having moved to location $q_{33}$ an accumulation of $+2$ counts in the positive $y$ direction causes the output point to move from its original location $r_{30}$ to location $r_{31}$ reducing the distance between followup and output points Q and R, respectively, to one half the unit step between adjacent output points. Again it can be seen for this example that the followup points when following a curve such as any one of the curves $C_1$–$C_3$ greater than $1/**2$ from the last output point R.

Summarizing, it can clearly be seen that in either mode of distribution (i.e., the modes of FIGS. 2 and 3) the deviation of the train of output points R from the curve being interpolated is at all times restricted to within $1/**2$ times the length of step of the output point R.

Figure 4:
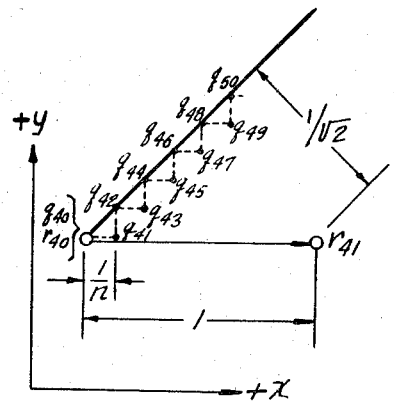
FIG. 4 is a diagram illustrating the maximum possible deviation of the output point relative to the followup point in the case where one step of the output point is made to correspond to $n$ steps of the followup point.

In addition to the above arrangement, it is possible to extend the principles of the instant invention so as to make one step of the output point R correspond to $n$ steps of the followup point allowing the followup point to undertake more than two steps as is suggested in the preferred embodiment before stepping of the output point. In this case, the components of the stepwise movement of the followup point are accumulated in the direction of the associated coordinate axis and, each time the accumulated total of the associated axis achieves a count $\pm n$, the output point is shifted one step in a corresponding plus or minus direction of the associated axis accumulating the threshold count and at the same time the accumulation is then reset to zero. However, as will readily be observed from a consideration of FIG. 4, which illustrates a case where the line C to be traced is a straight line of positive slope 1 extending at an angle of 45° to the coordinate axes, the result obtainable with the correspondency between one output step and $n$ followup steps is the same as that obtainable in the particular case described above where $n = 2$, since the maximum possible deviation of the train of points R remains unchanged or equal to $1/**2$ times the length of step of the output point. In FIG. 4, the step of the output point R from $r_{40}$ to $r_{41}$ in the positive $x$ direction corresponds to the set of accumulated successive steps $n$ of the followup point Q, $q_{40}$–$q_{41}$, $q_{42}$–$q_{43}$, $q_{44}$–$q_{45}$, et cetera. Obviously, the accumulation of $n$ steps of the followup points Q in the positive $y$ direction will cause the output point to step in the positive $y$ direction by one unit step, in a similar manner to that described above.

Figure 5:
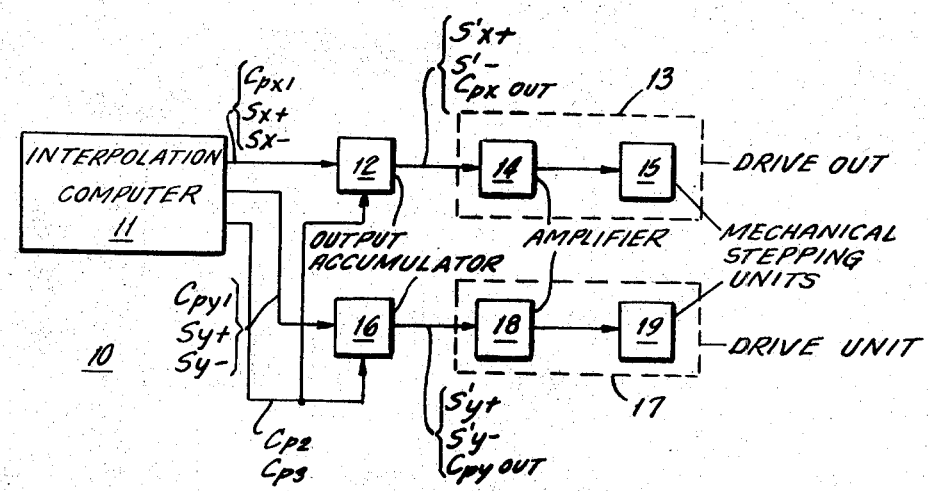
FIG. 5 is a block diagram showing one embodiment of the instant invention.

Referring now to FIG. 5, there is shown therein in diagrammatic fashion a digital interpolator 10 designed in accordance with the principles of the instant invention. Digital interpolator 10 is comprised of a pulse-distributing computer 11 of convention type such as that described in U.S. Pat. No. 3,254,203, for example, and which is operable to perform calculations with the curve given as an input thereto and, upon the basis of the result of such calculations, produces followup signal pulses in succession to shift the followup point Q stepwise while maintaining its deviation from the input curve within one unit or step length as shown, for example, in the conventional arrangement of points P of FIG. 1. For example, when the followup point is to be shifted in the positive or negative $x$ direction, the computer 11 transmits to an $x$-axis logic device 12 a respective sign signal $Sx+$ or $Sx-$ and a distributing pulse or timing pulse $Cpx1$.

The logic device 12 is operable to accumulate such distributing pulses until a total of +2 or −2 steps in the $x$ direction develops between the followup and output points, at which time logic device 12 produces an output sign signal $S'x+$ or $S'x-$ and an output distributing pulse $Cpx$ which is then applied to an amplifier circuit 14 which forms a part of the $x$-axis driving means 13. The output of amplifier 14 is applied to an $x$- axis drive unit 15 which is another component of device 13 and, upon receiving the amplifier output, operates to displace the output point one unit step in either the $+x$ or $-x$ direction.

Similarly, when the followup point is to be shifted in the positive $y$ or negative $y$ direction, a corresponding sign signal $Sy+$ or $Sy-$ and a distributing pulse signal $Cpy1$ are emitted from computer 11 to $x$-axis logic device 12. The $y$-axis logic device then produces an output including a corresponding sign signal $S'y+$ or $S'y-$ and an output distributing pulse $Cpy$ which signals are applied to amplifier means 18 forming part of a $y$-axis driving device 17 in order to operate a $y$-axis drive unit 19. The control clock pulses $Cp2$ and $Cp3$ are emitted from computer 11 to the logic devices 12 and 16 for purposes to be described hereinbelow.

Figure 6:
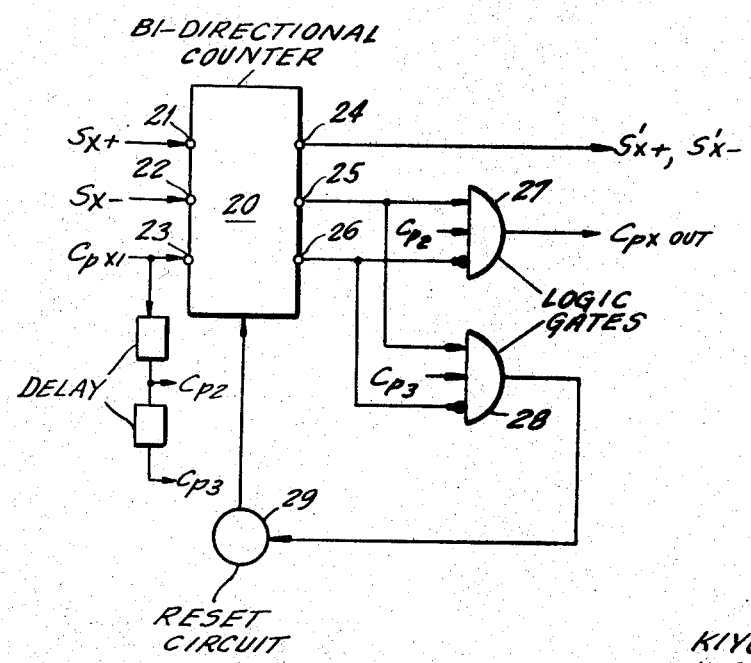
FIG. 6 is a block diagram showing a portion of the system of FIG. 5 in greater detail.

Whereas in the above illustration, the logic devices 12 and 16 are supplied with respective sign signals $Sx+$ or $Sx-$ and $Sy+$ or $Sy-$ and respective distributing pulses $Cpx1$ and $Cpy1$ from the computer unit 11, it should also be understood that devices 12 and 16 may alternatively be fed with respective distributing pulses $Cpx+$ or $Cpx-$ and $Cpy+$ or $Cpy-$ each of these pulses including a sign component as a result of the polarity of the pulses which systems are available in numerous conventional digital interpolators. Obviously, in such cases logic devices 12 and 16 may be designed to generate signal outputs of corresponding polarities. FIG. 6 diagrammatically illustrates one preferred embodiment of the accumulator logic device of FIG. 5 in greater detail. It should be understood that the logic device of FIG. 6 may be used with equal success for either of the two respective axes such as the units 12 and 16 shown in FIG. 5. Obviously a third such device may be employed in systems which follow in plot three-dimensional curves.

In FIG. 6 reference numeral 20 indicates a reversible or bidirectional three-stage binary counter preferably of the solid state type. One suitable arrangement of such counter is set forth in the text Analog-Digital Conversion Techniques published by the Technology Press of Massachusetts Institute of Technology and John Wiley & Sons Inc. and can be found on Pages 4—25 through 4—27. Another type is described in the text Pulse and Digital Circuits by Millman & Taub published by McGraw-Hill and discussed in Chapter 11, page 335. Obviously, any other conventional bidirectional counter may be employed.

Counter 20 is provided with three input terminals 21—13 and three output terminals 24—26. Input terminals 21 and 22 receive the sign signal $Sx+$ and $Sx-$ respectively, conditioning the counter for addition or subtraction, respectively, in readiness to count or accumulate the distributing pulses $Cpx1$ which are successively fed to input terminal 23. At the output terminals 24—26 it should be noted that binary states or levels "1" or "0" in various combinations will be developed at these terminals in accordance with the particular value of the accumulation in the counter in the arrangement as shown in the Table below:

| Accumulation | Terminals | | |
|---|---|---|---|
| | 24 | 25 | 26 |
| +2 | 0 | 1 | 0 |
| +1 | 0 | 0 | 1 |
| 0 | 0 | 0 | 0 |
| −1 | 1 | 1 | 1 |
| −2 | 1 | 1 | 0 |

As can be seen from a consideration of the above Table, the combination of the output state "1" of terminal 25 and the output state "0" of terminal 26 always indicates that the accumulation in the counter has a value of either +2 or −2. The plus or minus sign of the accumulation is represented by the state "0" or "1", respectively, of the output terminal 24, which corresponds to its respective output terminal 24, which corresponds to its respective output sign signal $S'x+$ or $S'x-$. When the accumulation in counter 20 reaches a value of either ±2, gates 27 and 28 are both conditioned to open, i.e., are enabled to pass a pulse or signal therethrough. Thus when an output pulse $Cpx$ is impressed upon the input of either of these gates this output pulse will pass through the gate to be applied to its associated drive means upon the receipt of a control clock pulse $Cp2$ from the computer unit and, when the succeeding control clock pulse $Cp3$ from the computer unit is fed to the gate 28, a pulse is emitted therefrom to actuate a reset circuit 29 causing counter 20 to be reset reducing the accumulation therein to zero. This reset operation provides an indication that the difference between the x coordinates of the followup and output points has been annulled.

The clock pulses Cp2 and Cp3 are generated after each x distribution pulse but are prohibited from being passed by gates 27 and 28, respectively, until the appropriate count is accumulated in counter 20. When a suitable number of such pulses are accumulated the output pulse, together with its sign signal Cpx out and S'x+ or S'x— respectively, are suitably amplified at 14 and applied to their associated stepping units which may, for example be a step motor to carry out the corresponding physical operation. The step motors may be used to control a machine tool, a plotting table, or to move any other mechanical device.

The clocking pulses Cp2 and Cp3 preferably occur in sequential fashion, each occurring, for example, after its associated stepping pulse Cpx (or Cpy or Cp2, as the case may be). Clock pulse Cp 2 preferably occurs just after stepping pulse Cpx to assure that the last stepping pulse has been accumulated in bidirectional counter 20. Clocking pulse Cp3 preferably occurs just after clock pulse Cp2 to assure that the drive pulse is passed to the driving device 13, for example, for operation thereof. These functions can be carried out, for example, by the amplifier delay circuits shown in the FIG. It is preferred that clocking pulse Cp3 occurs before the next stepping pulse to insure the fact that the bidirectional counter 20 is reset to zero before the next accumulation occurs therein.

Although one embodiment of the instant invention has been illustrated and described, it will be apparent to those skilled in the art that various changes and modifications may be made therein without departing from the spirit of the invention. For example, it should be understood that the principles of the invention can also be employed in realizing digital interpolators adapted for use with three-dimensional curves.

We claim:

1. A digital interpolator comprising a pulse-distributing computer unit for producing followup signals effective to shift the followup point stepwise through uniform intervals in such a manner as to maintain the deviation of the followup point from the input curve within the length of step of the followup point, logic accumulating means for each of the coordinate axes operable to accumulate said followup signals generated by the computer unit in the respective axis directions of the coordinate system framed for reference; first logical gating means coupled to accumulating means operable each time the value of the accumulated total in the direction of either coordinate axis reaches $\pm n$, to produce an output signal of positive or negative sign according to the sign of the accumulated total, second logical gating means coupled to said accumulation means for resetting said accumulation means to reduce the accumulated total to zero at the same time the output signal is generated; drive means coupled to said first logical gating means to transform the output signal from said logic means into a physical quantity effective to shift the output point in a corresponding plus or minus direction of the respective coordinate axis in step incremental, each of the length corresponding to $n$-times the length of step of the followup point where $n$ is any real integer.

2. The device of claim 1 wherein said accumulation means is a bidirectional counter capable of accumulating $\pm n$ pulses.

3. A digital interpolator for tracing an N-dimensional curve where N**2 comprising first means for generating step pulses for each coordinate axis each representing a successive step in followup points in each of the coordinate axes by a uniform distance $d$; the improvement comprising:

second means for generating either one of two sign signals representing the positive or negative direction said followup point undergoes;

bidirectional counter means for each coordinate axis for receiving an associated step pulse and sign pulse to accumulate either a positive or negative count;

first logical gating means for each coordinate axis coupled to an associated counter means for generating an output signal upon the accumulation of $\pm n$ counts in said counter means;

second logical gating means for each coordinate axis coupled to an associated counter means for resetting said counter means to zero when an accumulated count of $\pm n$ is achieved; and drive means for each coordinate axis coupled to an associated first logical gating means for advancing the output point through an incremental step of either positive or negative direction along its associated axis; said incremental step being $n$ times the length of step taken by the followup point, where $n$ is any real integer.

4. The device of claim 3 where $n = 2$; said counter means being a bidirectional counter having a plurality of stages sufficient to accumulate a count of $\pm 2$; the incremental step produced by said drive unit being twice as great as the uniform step $d$ taken by said followup point along the associated axis.

5. The device of claim 3 further comprising means for developing timing pulses for each coordinate axis for enabling first said first logical gating means and then said second logical gating means in succession after introducing a pulse to their associated counter means.

6. A method for generating a two-dimensional curve of any slope comprising the steps of:

a. stepping a first amount equal to a first predetermined multiple number of a unit distance along a first coordinate axis from a point of origin;

b. stepping a second amount equal to a second predetermined multiple number of unit distance along a second coordinate axis wherein said first and second amounts may differ from one another;

c. repeating steps a. and b. to simulate a desired curve shape; and d. establishing an output point by stepping along each coordinate axis a distance $n$-times the unit distance as soon as the distance stepped in each coordinate axis is equal to $n$-times the uniform distance, wherein $n$ is equal to 1, 2, 3, ..., etc.